United States Patent
Miyaji

(10) Patent No.: US 11,874,678 B2
(45) Date of Patent: Jan. 16, 2024

(54) VIBRATION CONTROL DEVICE AND METHOD USING ADJUSTABLE COMMAND FILTER AND ADJUSTABLE SERVO-AMPLIFIER

(71) Applicant: OKUMA Corporation, Aichi (JP)

(72) Inventor: Masashi Miyaji, Aichi (JP)

(73) Assignee: OKUMA CORPORATION, Aichi (JP)

( * ) Notice: Subject to any disclaimer, the term of this patent is extended or adjusted under 35 U.S.C. 154(b) by 140 days.

(21) Appl. No.: 17/148,795

(22) Filed: Jan. 14, 2021

(65) Prior Publication Data

US 2021/0223803 A1    Jul. 22, 2021

(30) Foreign Application Priority Data

Jan. 20, 2020    (JP) .................................. 2020-006940

(51) Int. Cl.
  *G05D 19/02*     (2006.01)
  *G05B 19/404*    (2006.01)
(52) U.S. Cl.
  CPC ........... *G05D 19/02* (2013.01); *G05B 19/404* (2013.01); *G05B 2219/21138* (2013.01);
  (Continued)
(58) Field of Classification Search
  CPC ................ G05D 19/02; G05B 19/404; G05B 2219/21138; G05B 2219/37435; G05B 2219/41145; G05B 2219/49048; G05B 2219/49054; G05B 19/4142; G05B 2219/34013

See application file for complete search history.

(56) References Cited

U.S. PATENT DOCUMENTS 5,079,490 A * 1/1992 Kita .................... G05B 19/232
                                                    700/184
2002/0016648 A1* 2/2002 Fujita .................. G05B 19/416
                                                    700/188

(Continued)

FOREIGN PATENT DOCUMENTS

JP       103121738 A    5/1991
JP       2004005469 A   1/2004

(Continued)

OTHER PUBLICATIONS

JPO Notice of Reasons for Refusal for corresponding JP Application No. 2020-006940; dated Jul. 18, 2023.

*Primary Examiner* — Kenneth M Lo
*Assistant Examiner* — Jonathan Michael Skrzycki
(74) *Attorney, Agent, or Firm* — CANTOR COLBURN LLP

(57) ABSTRACT

There are disclosed a vibration control device and a vibration control method that control shaft torsional vibration and machine stand vibration without installing a special sensor or measurement instrument. A vibration control device includes an amplification factor change unit that changes an amplification factor of an amplification unit used for amplifying a deviation between a command value and a detection value in a servo amplifier, a vibration detection unit that measures the frequency and the amplitude of vibration superimposed on a moving part, and a filter change unit that changes a filter based on the frequency and the amplitude detected by the vibration detection unit.

4 Claims, 2 Drawing Sheets

(52) U.S. Cl.
CPC ............ *G05B 2219/37435* (2013.01); *G05B 2219/41* (2013.01); *G05B 2219/41004* (2013.01); *G05B 2219/41145* (2013.01)

(56) References Cited

U.S. PATENT DOCUMENTS

| | | |
|---|---|---|
| 2003/0184251 A1 | 10/2003 | Oyama et al. |
| 2006/0208683 A1* | 9/2006 | Ide .......................... G05D 3/12 318/609 |
| 2009/0009128 A1* | 1/2009 | Okita .................. G05B 13/024 318/619 |
| 2012/0169265 A1 | 7/2012 | Usui et al. |
| 2017/0063269 A1 | 3/2017 | Miklosovic et al. |

FOREIGN PATENT DOCUMENTS

| | | | |
|---|---|---|---|
| JP | 2004334772 | A | 11/2004 |
| JP | 2009015448 | A | 1/2009 |
| JP | 2012143100 | A | 7/2012 |

* cited by examiner

VIBRATION CONTROL DEVICE AND METHOD USING ADJUSTABLE COMMAND FILTER AND ADJUSTABLE SERVO-AMPLIFIER

CROSS REFERENCE TO RELATED APPLICATION

The present invention claims priority under 35 U.S.C. § 119 to Japanese Patent Application No. 2020-006940 filed on Jan. 20, 2020, the entire content of which is incorporated herein by reference.

TECHNICAL FIELD

The present disclosure relates to a servo control device for various machines including, for example, machine tools, and particularly to a vibration control device that controls vibration superimposed on a moving part.

BACKGROUND

Machines that drive a moving part by a servo mechanism are known. For example, in a machine tool, a servo mechanism drives one or both of a workpiece and a tool and causes a relative movement between them, thereby machining the workpiece. The moving part is driven by a motor via a ball screw or the like, or is directly driven by a linear motor or the like. Typically, when the moving part is accelerated or decelerated, a large force is applied from the motor, which causes shaft torsional vibration of the ball screw or machine stand vibration. This results in increase in positioning settling time and degradation in accuracy of locus and machined surface quality.

JP 2004-334772 A discloses a positioning control device that calculates the amount of shaft torsion of a drive shaft from a position command value and a position detection value of a moving part and corrects the position command value, thereby offsetting and controlling a deviation caused by shaft vibration.

In the technique disclosed in JP 2004-334772 A, after a deviation is caused by shaft torsion, the amount of correction is calculated, and correction is then performed based on that amount of correction, which inevitably results in a delay in correction. Further, a feedback control system typically has a tracking delay caused by a phase delay, and therefore, a delay is also caused in operation of correcting the moving part according to the amount of correction, and this results in a problem of insufficiently controlled vibration. If machine stand vibration is generated by the reaction force of the force of the motor driving the moving part, the moving part would vibrate following the vibration of the machine stand, and a tip of the tool would thus vibrate, resulting in no improvement in machined surface quality, even if, in an ideal feedback control system having no tracking delay, shaft torsion could be completely corrected and a position command value and a position detection value could be matched at any time.

Further, in order to control machine stand vibration, machine stand vibration needs to be detectable. To this end, a technique of installing, for example, an acceleration sensor on the machine stand and observing the sensor is commonly adopted.

SUMMARY

An object of the present disclosure is to provide a vibration control device and a vibration control method for controlling shaft torsional vibration and machine stand vibration without installing a special sensor or measurement instrument.

A vibration control device according to the present disclosure is a vibration control device for controlling vibration of a moving part in a machine, the machine including the moving part that is driven by a servo motor, a numerical control device that generates a movement command for the moving part, a filter that shapes the command generated by the numerical control device and limits frequencies to be passed, a detector that detects a position or a speed of the moving part, and a servo amplifier that controls a force generated by the servo motor or a force transmitted to the moving part such that a deviation between an output from the filter and a detection value detected by the detector becomes 0, and the vibration control device includes an amplification factor change unit that changes an amplification factor of an amplification unit used for amplifying the deviation in the servo amplifier, a vibration detection unit that measures, from the deviation, the frequency and the amplitude of vibration superimposed on the moving part, and a filter change unit that changes the filter based on the frequency and the amplitude detected by the vibration detection unit.

The amplification factor change unit may enable the detector to detect vibration of the moving part by reducing the amplification factor of the amplification unit at the start of operation, and returns the amplification factor to its original condition at the end of operation.

The filter change unit may update, when the amplitude of the vibration exceeds a predetermined amplitude, a property of the filter such that the gain of the filter at the frequency of the vibration is reduced by at least the ratio of the amplitude of the vibration to the predetermined amplitude.

A vibration control method according to the present disclosure is a vibration control method for controlling vibration of a moving part in a machine, the machine including the moving part that is driven by a servo motor, a numerical control device that generates a movement command for the moving part, a filter that shapes the command generated by the numerical control device and limits frequencies to be passed, a detector that detects a position or a speed of the moving part, and a servo amplifier that controls a force generated by the servo motor or a force transmitted to the moving part such that a deviation between an output from the filter and a detection value detected by the detector becomes 0, and the vibration control method includes the steps of reducing an amplification factor of an amplification unit used for amplifying the deviation in the servo amplifier, measuring the frequency and the amplitude of vibration superimposed on the moving part, reducing, when the amplitude of the vibration exceeds a predetermined amplitude, the gain of the filter at the frequency of the vibration by at least the ratio of the amplitude of the vibration to the predetermined amplitude, and returning the amplification factor of the amplification unit used for amplifying the deviation to an original amplification factor.

According to the present disclosure, it becomes possible to control shaft torsional vibration and machine stand vibration without installing a special sensor or measurement instrument.

BRIEF DESCRIPTION OF DRAWINGS

An embodiment of the present disclosure will be described based on the following figures, wherein.

DESCRIPTION OF EMBODIMENT

Hereinafter, an embodiment of the present disclosure will be described with reference to the drawings.

Figure 1:
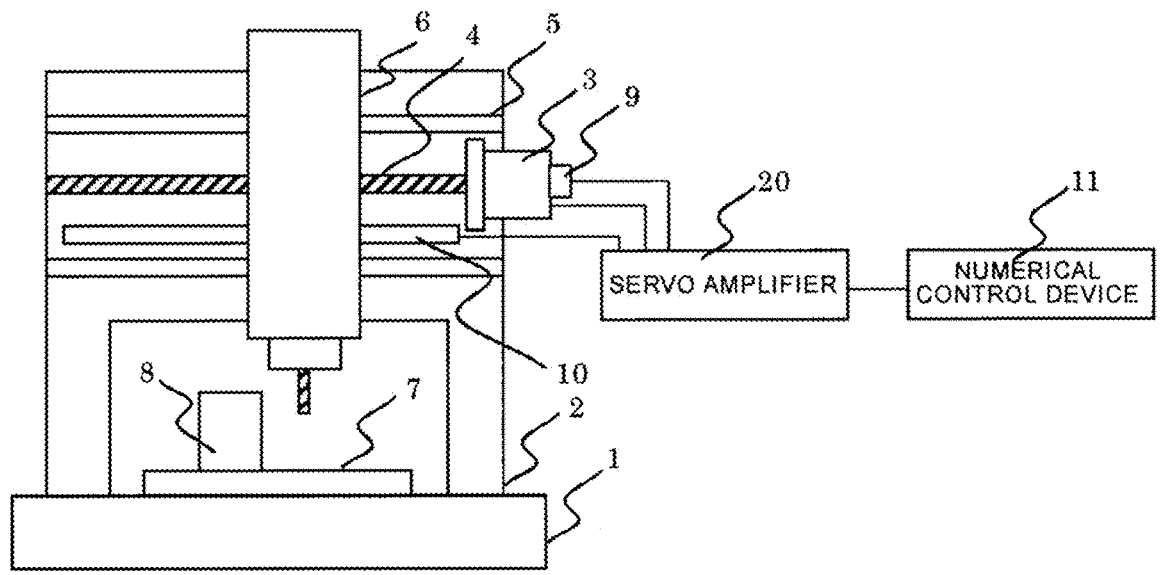
FIG. 1 illustrates an example of a general machine tool.

FIG. 1 illustrates an example of a general machine tool.

The machine tool has a motor 3, a ball screw 4, a guide 5, and a spindle head 6 arranged on the front surface of a structure body 2 standing on a base 1 fixed on a floor surface. Torque generated by the motor 3 is converted to a force acting along the linear direction by the ball screw 4, and the force controls movement of the spindle head 6 movably supported by the guide 5, along the right-and-left direction in the figure. A similar mechanism controls movement of the spindle head 6 along the up-and-down direction in the figure, thereby controlling movement of a tool attached to a tip of the spindle head 6. Movement of a table 7 positioned on the base 1 is controlled along the direction penetrating the paper surface, thereby controlling movement of a workpiece 8 attached on the top surface of the table 7. The workpiece 8 is machined by rotating the tool attached to the spindle head 6.

The torque generated by the motor 3 is controlled and produced by a servo amplifier 20 such that a position detection value or a speed detection value detected by a rotation angle detector 9 attached to the motor 3, by a load position detector 10 attached to the structure body 2 for enabling direct detection of a position of the spindle head 6, or by both of them match a position command value or a speed command value generated by a numerical control device 11.

Figure 2:
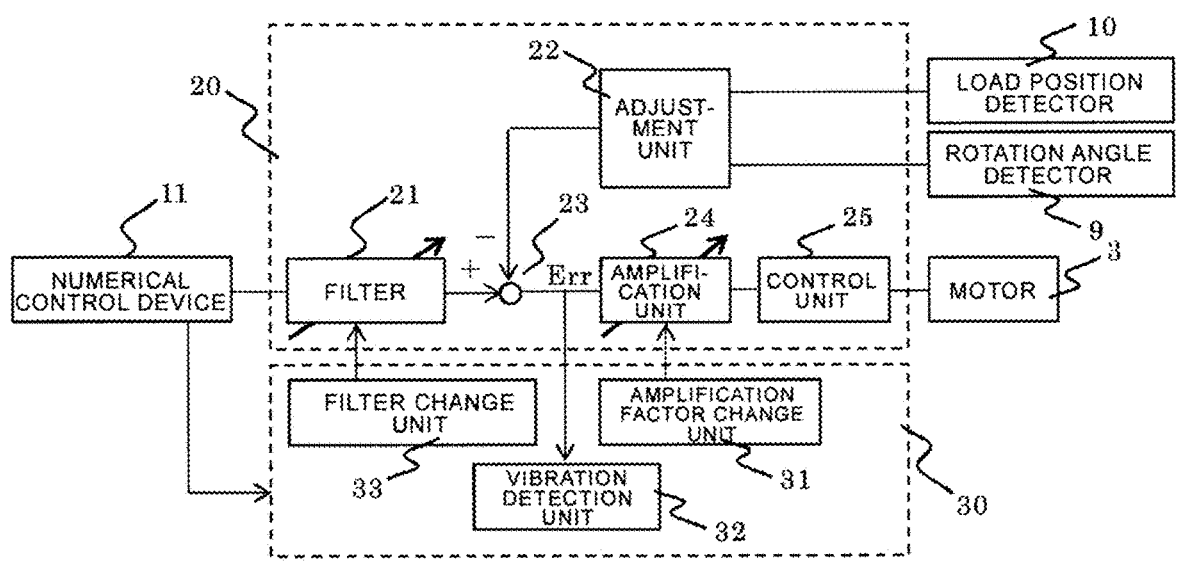
FIG. 2 is a block diagram illustrating a configuration of a vibration control device according to an embodiment.

FIG. 2 is a block diagram illustrating an internal configuration of the servo amplifier 20 described above and a configuration of a vibration control device 30 according to the embodiment of the present disclosure.

In the servo amplifier 20, a filter 21 shapes the position command value or the speed command value generated by the numerical control device 11. The position detection value or the speed detection value detected by the rotation angle detector 9, by the load position detector 10, or by both of them is selected or synthesized by an adjustment unit 22, thereby calculating a position detection value or a speed detection value for control use. Signals output from the filter 21 and the adjustment unit 22 are subjected to subtraction by a subtracter 23, to thereby obtain a deviation Err. The deviation Err is amplified by an amplification unit 24, and a control unit 25 then controls the torque generated by the motor 3 such that the deviation Err=0 is achieved.

Here, if the ball screw 4 has low rigidity, shaft torsion of the ball screw 4 causes delay and vibration in a response by the spindle shaft 6, as compared with the command value generated by the numerical control device 11. That is, a detection value detected by the load position detector 10 includes the superimposed delay and vibration, and the deviation Err is generated.

In contrast, if, for example, the ball screw has high rigidity, and if the amplification unit 24 and the control unit 25 that can perform sufficient control are achieved, for example, by setting the high amplification factor in the amplification unit 24, the response delay and vibration of the spindle head 6 described above are reduced, and the deviation Err≈0 can be achieved. However, the reaction force generated when the spindle head 6 is driven is transmitted to the structure body 2, and displacement and vibration occur due to the rigidity of the machine stand and the mechanism. At this time, control is performed to achieve the deviation Err≈0, resulting in displacement and vibration of the spindle head 6 integrally with the structure body 2.

In the vibration control device 30, upon receipt of an operation command from a superior device, such as the numerical control device 11, an amplification factor change unit 31 reduces the amplification factor of the amplification unit 24, and a vibration detection unit 32 measures the frequency and amplitude of vibration included in the deviation Err. If the amplitude of the detected vibration exceeds a predetermined amplitude, a filter change unit 33 reduces the gain of the filter 21 at the frequency of the vibration detected by the vibration detection unit 32. The predetermined amplitude may be an amplitude determined in advance or may be changed by an administrator or the like. The amplification factor change unit 31 then returns the amplification factor of the amplification unit 24 to the factor before amplification reduction, and the vibration control device 30 completes the operation.

In the above operation, the amplification factor change unit 31 reduces the amplification factor of the amplification unit 24, and therefore, displacement and vibration can be observed by means of the deviation Err without installing an acceleration sensor or the like, even if the displacement and vibration are caused by the rigidity of the machine stand and the mechanism. Also, the vibration detection unit 32 can identify the frequency and amplitude of vibration included in the deviation Err by using, for example, an FTT (fast Fourier transform) algorithm. Further, the filter change unit 33 can reduce the gain at the vibration frequency of the filter 21 by adding a filter having a band-stop characteristic in front of or behind the existing filter 21 and redefining that filter as the filter 21. Alternatively, the gain of the filter 21 can be reduced by setting the order of the filter 21 to a higher order in advance and changing the filter coefficients. The gain at the vibration frequency is reduced by at least the ratio of the amplitude of the detected vibration to the predetermined amplitude.

Figure 3:
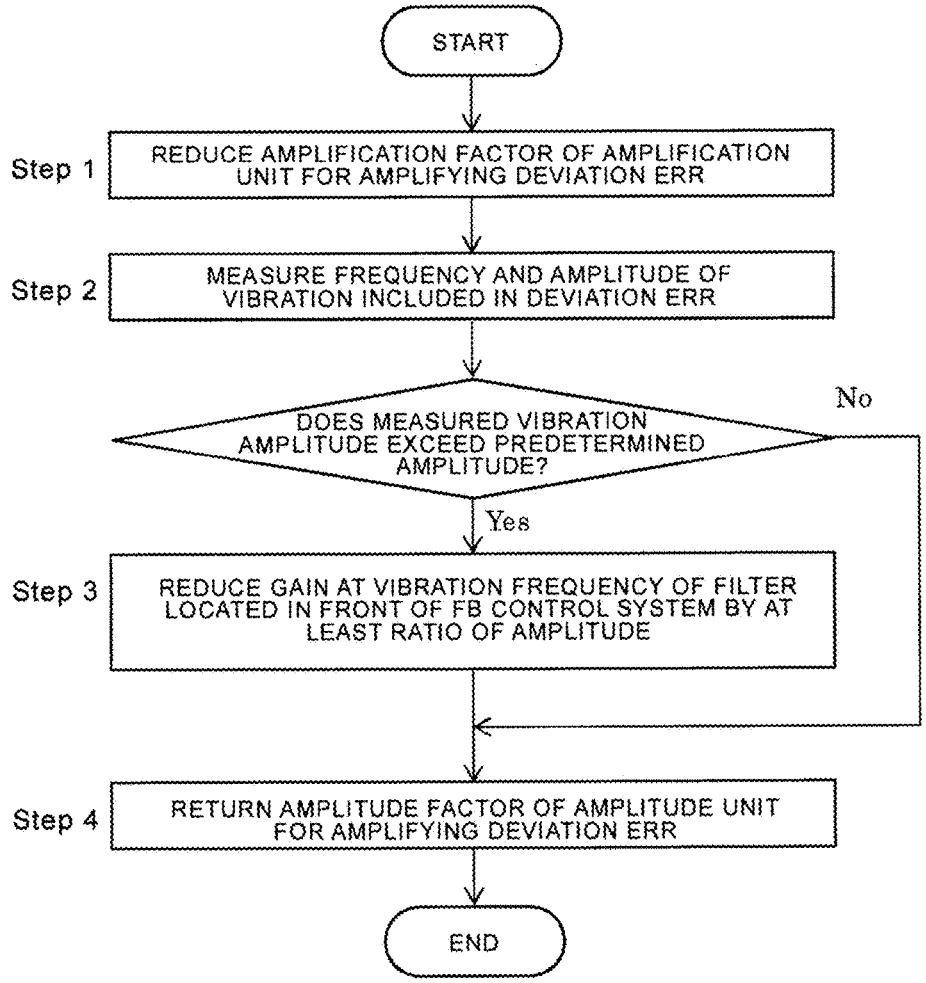
FIG. 3 is a flowchart illustrating the procedure of a vibration control method according to the embodiment.

FIG. 3 is a flowchart illustrating the procedure of a vibration control method according to the embodiment of the present disclosure.

The vibration control device 30 starts operation upon receipt of an operation command from a superior device, such as the numerical control device 11, and reduces the amplification factor of the amplification unit 24 which is used for amplifying a deviation Err (Step 1). The vibration control device 30 then measures the frequency and amplitude of vibration included in the deviation Err (Step 2). If the amplitude of the detected vibration exceeds a predetermined amplitude (Yes), the vibration control device 30 reduces the gain of the filter 21 at the frequency of the detected vibration by at least the ratio of the amplitude (Step 3). If the amplitude of the detected vibration does not exceed the predetermined amplitude (No), the gain of the filter 21 remains without change. The vibration control device 30 then returns the amplification factor of the amplification unit 24 to the factor before reduction (Step 4). This completes the operation.

Figure 4:
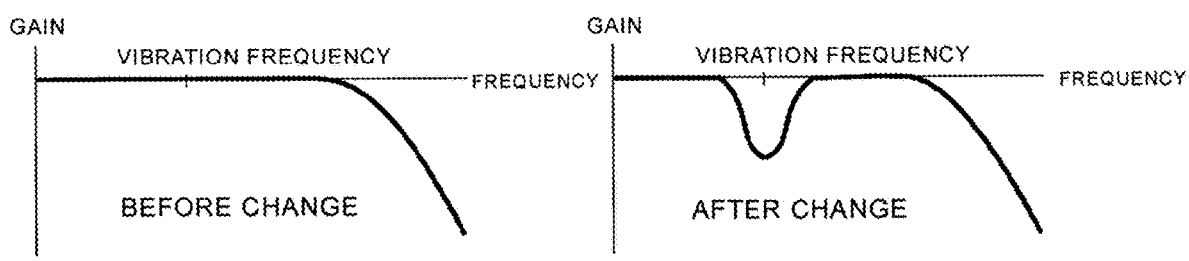
FIG. 4 illustrates an example of a filter property before and after a filter is changed.

FIG. 4 illustrates an example of filter properties before and after the filter 21 is changed.

Before the filter 21 is changed, the gain at the vibration frequency is 1, and the relevant frequency components included in the command pass through the filter 21 completely. In contrast, after the filter 21 is changed, the gain at the vibration frequency is reduced such that the gain becomes equal to or smaller than the predetermined amplitude/the vibration amplitude. The relevant frequency components included in the command are also reduced in proportion to this reduction. This also leads to reduction in exciting force applied to the mechanical system and thus in vibration caused by shaft torsion of the ball screw 4 and vibration caused by the rigidity of the machine stand and the mechanism.

With the vibration control device and the vibration control method described above, it is possible to control shaft torsional vibration and machine stand vibration without installing a special sensor or measurement instrument.

Although, in the above embodiment, the machine tool equipped with a shaft extending from the motor via the ball screw for driving the spindle head has been described as an example, the above embodiment can also be applied to a linear motor-driven machine tool and can also be applied to industrial machines other than machine tools. The embodiment can also be applied to not only the linearly driven shaft but also a rotationally driven shaft.

Further, although, in order to clarify the purpose, the amplification unit 24 and the control unit 25 have been included as components for controlling the torque generated in the motor 3 based on the deviation Err, these components may be configured as a single integrated control unit. A detection target to be detected by the vibration detection unit does not necessarily have to be the deviation Err, and it may be replaced with, for example, a detection value by the load position detector 10, as long as it is a signal on which vibration of the moving part is superimposed. The vibration control method according to the embodiment of the present disclosure can be used in both of manual and automatic processes, regardless of their form.

The invention claimed is:

1. A system comprising:
 a moving part that is driven by a servo motor;
 a numerical control device that generates a movement command for the moving part;
 a filter that shapes the movement command generated by the numerical control device and limits frequencies to be passed;
 a detector that detects a position or a speed of the moving part;
 a servo amplifier that controls a force generated by the servo motor or a force transmitted to the moving part such that a deviation between an output from the filter and a detection value detected by the detector becomes 0
wherein a vibration of the moving part is controlled by a change of an amplification factor used for amplifying the deviation in the servo amplifier, a measurement, from the deviation, of a frequency and an amplitude of vibration superimposed on the moving part, and a change of the filter based on the frequency and the amplitude.

2. The system according to claim 1, wherein the detector is enabled to detect vibration of the moving part by reducing the amplification factor and returning the reduced amplification factor to an original amplification factor.

3. The system according to claim 1, wherein when the amplitude of the vibration exceeds a predetermined amplitude, a property of the filter is updated such that the gain of the filter at the frequency of the vibration is reduced by at least a ratio of the amplitude of the vibration to the predetermined amplitude.

4. A system comprising:
 a moving part that is driven by a servo motor;
 a numerical control device that generates a movement command for the moving part;
 a filter that shapes the movement command generated by the numerical control device and limits frequencies to be passed;
 a detector that detects a position or a speed of the moving part; and
 a servo amplifier that controls a force generated by the servo motor or a force transmitted to the moving part such that a deviation between an output from the filter and a detection value detected by the detector becomes 0,
wherein a vibration control method of the system for controlling vibration of the moving part comprises: reducing an amplification factor used for amplifying the deviation in the servo amplifier, measuring a frequency and an amplitude of vibration superimposed on the moving part, reducing, when the amplitude of the vibration exceeds a predetermined amplitude, a gain of the filter at the frequency of the vibration by at least the ratio of the amplitude of the vibration to the predetermined amplitude, and returning the amplification factor used for amplifying the deviation to an original amplification factor.

* * * * *